United States Patent
Jones et al.

(10) Patent No.: US 7,571,438 B2
(45) Date of Patent: Aug. 4, 2009

(54) METHOD AND SYSTEM FOR RESOURCE MANAGEMENT WITH INDEPENDENT REAL-TIME APPLICATIONS ON A COMMON SET OF MACHINES

(75) Inventors: Michael B. Jones, Redmond, WA (US); Paul J. Leach, Seattle, WA (US); Richard P. Draves, Jr., Seattle, WA (US); Joseph S. Barrera, III, Belmont, CA (US)

(73) Assignee: Microsoft Corporation, Redmond, WA (US)

( * ) Notice: Subject to any disclaimer, the term of this patent is extended or adjusted under 35 U.S.C. 154(b) by 1203 days.

(21) Appl. No.: 09/909,072

(22) Filed: Jul. 18, 2001

(65) Prior Publication Data

US 2002/0007389 A1    Jan. 17, 2002

Related U.S. Application Data

(62) Division of application No. 08/568,578, filed on Dec. 7, 1995, now Pat. No. 6,282,561.

(51) Int. Cl.
*G06F 9/46* (2006.01)
(52) U.S. Cl. .................................. 718/102; 718/104
(58) Field of Classification Search ......... 709/226–228; 718/104, 102
See application file for complete search history.

(56) References Cited

U.S. PATENT DOCUMENTS

| | | | |
|---|---|---|---|
| 4,481,583 A | 11/1984 | Mueller ..................... | 364/300 |
| 4,890,227 A | 12/1989 | Watanabe et al. ........... | 364/300 |
| 5,155,854 A * | 10/1992 | Flynn et al. ................. | 718/104 |
| 5,303,369 A | 4/1994 | Borcherding et al. ....... | 395/650 |
| 5,307,496 A * | 4/1994 | Ichinose et al. ............. | 718/104 |

(Continued)

OTHER PUBLICATIONS

J. Huang et al., "Resource Management for Continuous Multimedia Database Applications," IEEE onDisc, pp. 46-54, 1994.

(Continued)

*Primary Examiner*—Meng-Ai An
*Assistant Examiner*—Camquy Truong
(74) *Attorney, Agent, or Firm*—Lee & Hayes, PLLC

(57) ABSTRACT

A resource management mechanism is provided to ensure that real-time application programs running on a single machine or set of machines exhibit predictable behavior. The resource management mechanism employs the abstraction of an activity which serves as the basis for granting resource reservations and for accounting. An activity submits a request for resources in specified amounts to a resource planner. The activity is resource self-aware so that it is aware of its resource requirements. The activity may query resource providers to obtain resource requirements for particular operations. The resource planner determines whether the activity should be granted the requested reservation by employing an internal policy. Policy is separated by mechanism so that the resource planner may implement any of a number of policies. The resource planner may choose to grant the reservation to an activity or deny the request by an activity. When denying a request, the resource planner may inform the activity of what quantity of the requested resources are currently available so that the activity may submit a modified request. The resource management mechanism includes a dynamic feedback mechanism for initiating renegotiation of resource reservations when appropriate.

8 Claims, 12 Drawing Sheets

U.S. PATENT DOCUMENTS

| | | | | |
|---|---|---|---|---|
| 5,333,319 | A | | 7/1994 | Silen .......................... 395/650 |
| 5,341,499 | A | | 8/1994 | Doragh ....................... 395/700 |
| 5,421,011 | A | | 5/1995 | Camillone et al. .......... 395/650 |
| 5,442,791 | A | * | 8/1995 | Wrabetz et al. ............. 719/330 |
| 5,581,703 | A | | 12/1996 | Baugher et al. ........ 395/200.06 |
| 5,630,132 | A | | 5/1997 | Allran et al. ................ 395/670 |
| 5,634,006 | A | * | 5/1997 | Baugher et al. ............. 709/228 |
| 5,671,225 | A | | 9/1997 | Hooper et al. .............. 370/468 |
| 5,742,772 | A | * | 4/1998 | Sreenan ...................... 709/226 |
| 5,758,160 | A | | 5/1998 | McInerney et al. .......... 395/701 |
| 5,793,979 | A | | 8/1998 | Lichtman et al. ....... 395/200.56 |
| 5,812,844 | A | | 9/1998 | Jones et al. ................. 395/674 |
| 6,003,061 | A | | 12/1999 | Jones et al. ................. 709/104 |

OTHER PUBLICATIONS

D. Anderson et al., "Support for Continuous Media in the DASH System," IEEE onDisc, pp. 54-61, 1990.

D. Anderson, "Metascheduling for Continuous Media," ACM Transactions on Computer Systems, vol. 11, No. 3, Aug. 1993.

Andrzej Goscinski, "Distributed Operating Systems, The Logical Design," Addison-Wesley Publishing Company, 1992, pp. 437-464.

"A Butler Process for Resource Sharing On Spice Machines," ACM Transactions on Office Information System, vol. 3, No. 3, Jul. 1985.

M. Jones, "Adaptive Real-Time Resource Management Supporting Composition of Independently Authored Time-Critical Services," IEEE, pp. 135-139, 1993.

Mark Sylor et al., "Applying Network Management Standards to System Management; the case for the Common Agent," IEEE, pp. 110-117, 1994.

Douglass C.Locke, "Best-Effort Decision Making for Real-Time Scheduling," Ph.D Thesis, Computer Science Department, Carnegie Mellon University, pp. 1-144, 1986.

J. Duane Northcutt et al., "Decentralized Real-Time Scheduling," RADC-TR-90-182 Final Technical Report, Rome Air Development Center, Carnegie Mellon University, pp. A-1, A-3 through A-35, B-1 through B-24, C-1 through C15, C17 through C37, C41 through C-115, C-117 through C-141, C-143 through C-149, C-151 through C-163, 1990.

J. Duane Northcutt, "Mechanisms for Realiable Distributed Real-Time Operating Systems—The Alpha Kernel," *Perspectives in Computing,* vol. 16, W. Reinboldt, D. Siewiorek, eds., Academic Press, Inc., vol. 16, pp. 1-29, 31-171, 173-217, 219-235, 1987.

J. Duanne Northcutt, "The Alpha Operating System: Requirements and Rationale," *Archons Project Technical Report* #88011, pp. 1-70, 1988.

Charles L. Compton et al., "Collaborative Load Sheddding for Media-Based Applications," In *Proceedings of the International Conference on Multimedia Computing and Systems,* Boston, pp. 496-501, May 1994.

Peter Druschel et al, "Fbufs: A High-Bandwidth Cross-Domain Transfer Facility," In *Proceedings of the SIGOPS '93 Conference,* North Carolina, U.S.A., pp. 189-202, Dec. 1993.

Clifford W. Mercer et al., "Processor Capacity Reserves: Operating System Support for Multimedia Applications," In *Proceedings of the International Conference on Multimedia Computing and Systems,* Boston, pp. 90-99, May 1994.

Gerard A. Wall et al., "Bus Bandwidth Management in a High Resolution Video Workstation," pp. 274-288.

Lixia Zhang et al., "RSVP: A New Resource ReSerVation Protocol," *IEEE Network,* pp. 8-18, Sep. 1993.

* cited by examiner

METHOD AND SYSTEM FOR RESOURCE MANAGEMENT WITH INDEPENDENT REAL-TIME APPLICATIONS ON A COMMON SET OF MACHINES

RELATED APPLICATIONS

This is a divisional of U.S. patent application Ser. No. 08/568,578, filed Dec. 7, 1995, which is now U.S. Pat. No. 6,282,561.

TECHNICAL FIELD

The present invention relates generally to computer systems and more particularly to resource management of independent real-time application programs on a common machine or set of machines.

BACKGROUND OF THE INVENTION

Conventional resource management strategies for real-time application programs have been unsatisfactory. A "real-time application program" is an application program that must execute in a predictable and timely fashion in order to operate properly. Many current efforts to provide resource management for real-time application programs may only manage a static set of resources. In other words, the resource set may not change during the course of operation of the system. Another limitation of many conventional resource management strategies is that they only accommodate one type of resource (i.e., the resources must be homogeneous). An additional limitation of many conventional resource management strategies is that they rely upon the resource or the application program to determine which application program should be allocated a resource and what quantity of the resource should be allocated. Another conventional approach has been to rely upon human experts to correctly assign priorities to tasks within the system. Unfortunately, such human experts typically cannot accurately assign priorities for a dynamic mix of real-time application programs.

SUMMARY OF THE INVENTION

The present invention overcomes many of the limitations of conventional resource management schemes for real-time application programs. A computer system includes a number of local resources that a program may use. A resource planner is provided in the computer system for planning resource allocation. The resource planner includes a policy module for implementing a policy for arbitrating amongst requests to reserve resources and an independent planning engine that is separate from the policy module but that implements the policy of the module. A request is received at the resource planner for a program to reserve a resource, and the resource planner is used to determine whether to grant the request or not. The policy module of the resource planner may be replaced so as to implement another policy.

In accordance with another aspect of the present invention, multiple real-time application programs are concurrently run on a computer system. The real-time application programs require that at least some of the local resources be allocated to them in order to run properly. A resource planner is provided for programs to contact to reserve the local resources. The resource planner implements a universal policy for arbitrating amongst requests for the local resources. The resource planner receives requests for at least some of the local resources from the real-time application programs that are running on the computer system. The resource planner then arbitrates amongst the requests to grant or deny reservations for at least some of the local resources to the real-time application programs that submitted the request.

In accordance with a further aspect of the present invention, a resource planner is provided for granting reservations of shares of local resources of a computer system in response to a request. A request is received at the resource planner from a first program to reserve a first share of a selected one of the resources. A request from a second program to reserve a second share of the selected resource is received at the resource planner. The second program is not aware of the first program. The resource planner grants the first program a reservation for the first share of the selected resource and grants the second program a reservation for the second share of the selected resource so that the programs may share the selected resource.

In accordance with yet another aspect of the present invention, a resource planner is provided in a computer system for granting reservations of shares of resources in the computer system. A request for an activity to reserve a share of at least one of the resources is received at the resource planner. The activity includes at least a portion of multiple processes that are running on the computer system. The request is processed with the resource planner and granted so that the share of the requested resource is reserved for use by the activity.

In accordance with a further aspect of the present invention, a resource planner is provided for granting reservations for a share of the resources. An activity that is aware of its resource requirements is run on the computer system. The activity submits a request to the resource planner to obtain a reservation for a share of at least one of the resources where the request reflects the resource requirements of the activity. The request is processed by the resource planner to grant or deny the request.

In accordance with a still further aspect of the present invention, an activity submits a request for a reservation of a set of resources in specific amounts to the resource planner. The request is processed and it is determined that the request may not be granted to the activity. The resource planner returns a list of amounts of the set of resources that are currently available to the activity back to the activity.

In accordance with another aspect of the present invention, a negotiation is performed between a resource planner and activities to reserve shares of resources with the resource planner on behalf of the activities. In view of changing resource usage requirements, a renegotiation takes place between the resource planner and the activities to change reservations of resources on behalf of the activities to reflect the changing resource usage or requirements.

In accordance with an additional aspect of the present invention, allocation of an initial set of resources by activities is managed by a resource planner. The resources that are in the computer system are altered. In response, a resource planner adapts to manage allocation of the new set of resources in the computer system without interruption of operation of the resource planner.

In accordance with an additional aspect of the present invention, a first resource provider that manages access to a resource is queried. This first resource provider is called by an activity to perform an operation on behalf of the activity. The activity queries the first resource provider to determine a first set of resource requirements to perform the operation on behalf of the activity. The first resource provider, in turn, queries a second resource provider that is called by the first resource provider to complete the operation on behalf of the activity. The querying is used to determine a second set of resource requirements for the second resource provider to perform its role in the operation that is performed on behalf of the activity. The first set of resource requirements is determined to be a sum of the second set of resource requirements and any additional resource requirements for actions directly performed by the first resource provider to complete operation on behalf of the activity. The resource requirements of the activity are determined to be a sum of the first set of resource requirements and any additional resource requirements of the activity.

In accordance with a further aspect of the present invention, a method is practiced in a distributed system that has computer systems connected by network connections. Each computer system performs activities and has local resources as well as a local resource planner that allocates reservations of shares of the local resources to the activities. A request for a reservation of a share of a remote resource that is present at a selected one of the computer systems is received from an activity at a local resource planner of one of the computer systems. The request is forwarded to the local resource planner at the selected computer system and processed to generate a response. The response is returned to the activity that initiated the request.

In accordance with another aspect of the present invention, the computer system includes resources and real-time programs that require the use of at least some of the resources. The computer system also includes a resource planner that is independent of the real-time programs and the resources. The resource planner issues reservations to the real-time programs to use shares of at least some of the resources in response to the requests for reservations by the real-time programs.

BRIEF DESCRIPTION OF THE DRAWINGS

A preferred embodiment of the present invention will be described below relative to the following drawings.

DETAILED DESCRIPTION OF THE INVENTION

Figure 1:
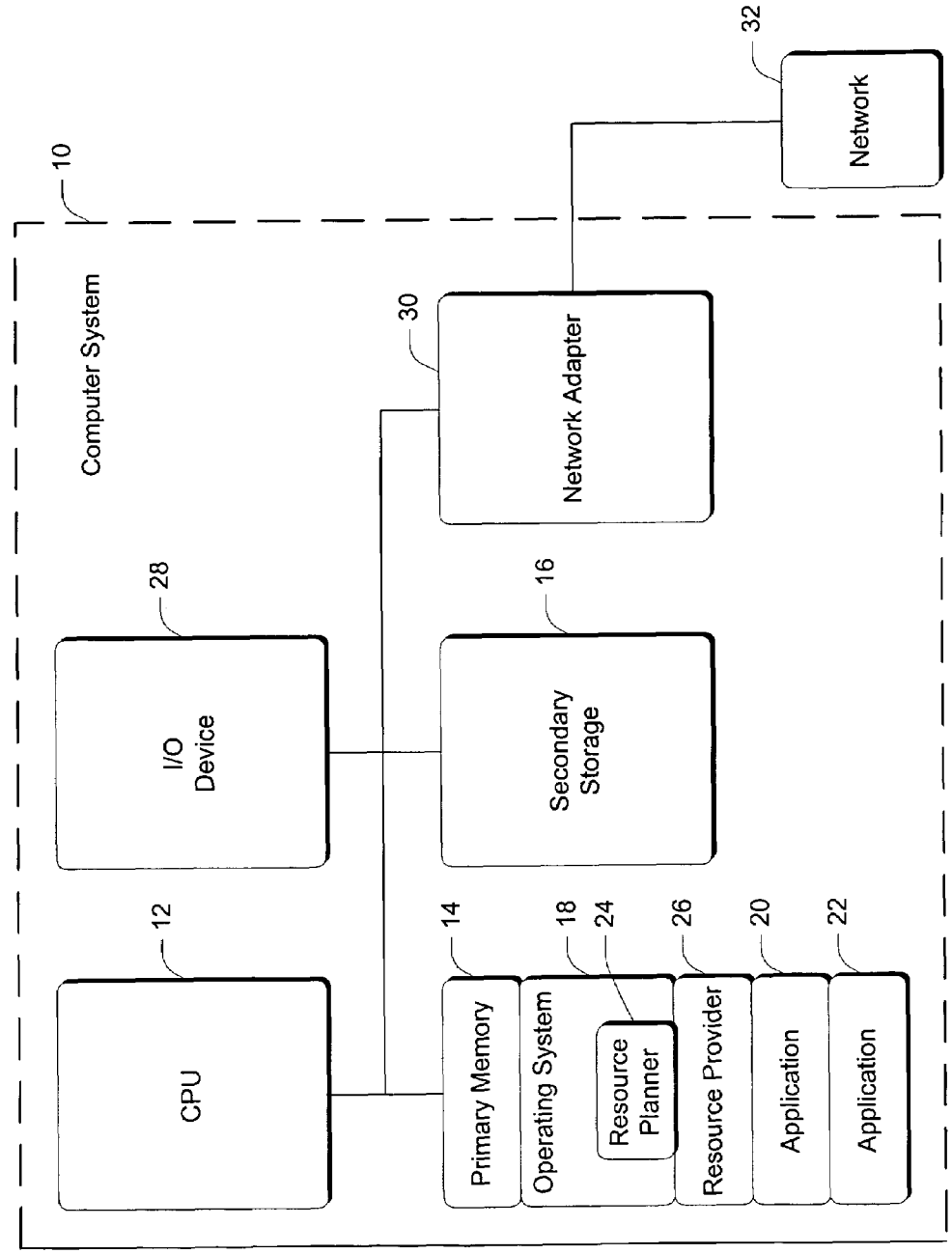
FIG. 1 is a block diagram of a computer system that is suitable for practicing the preferred embodiment of the present invention.

The preferred embodiment of the present invention provides a resource management mechanism for arbitrating resource requests and resource usage among independent real-time application programs that run simultaneously on a single machine or set of machines. The resource management mechanism is adaptable to installation on a distributed system having separate computer systems by installing the mechanism on each of the computer systems within the distributed system. The resource management mechanism utilizes dynamic feedback to adapt to changing resource availability and resource requirements. In addition, the resource management mechanism is extensible so that the resource management employed in the system accounts for new resources that are added to the system and for resources that are removed from the system. The resource management mechanism separates resource management policy from resource management mechanism such that the mechanism is independent of the policy. The mechanism for implementing policy is generalized so as to facilitate any one of a number of different policies. In the preferred embodiment of the present invention, real-time application programs are resource self-aware in that they are aware of what resources they require and what quantity of those resources they require. The applications negotiate with the resource management mechanism to reserve resources and ensure predictable performance.

A "resource," as used herein, refers to a limited hardware or software quantity that is provided by a machine. Examples of resources include CPU time, memory capacity, I/O bus bandwidth, network bandwidth, and devices, such as video frame buffers and sound cards. Resources may also encompass higher level software-defined resources that manage other resources. Resources are represented in the preferred embodiment of the present invention by objects that manage the resources. These objects are referred to as "resource providers." As will be described in more detail below, resource providers support operations such as allocating amounts of the resources, performing resource accounting, and providing notifications.

The preferred embodiment of the present invention also employs the notion of an "activity." An "activity" is an abstraction that serves as a generalization of a running program and is the unit of abstraction to which resources are allocated and against which resource usage is charged. Each activity is modeled by an activity object. It should be appreciated that an activity may span thread or process boundaries. Further, an activity may span address spaces and machines and may have multiple threads of control associated with it. Typically, however, each activity is associated with a single distinct executing program or application. For example, the operation of playing a video stream may constitute an activity. Similarly, the operation of recording and transmitting video for a video teleconferencing application may constitute an activity.

A "resource planner" is a program that arbitrates access to the resources of a machine amongst different activities. The resource planner tells an activity what amount of a resource, if any, is reserved for use by the activity. The resource planner is knowledgeable about all local resources. Each local resource is registered with the local resource planner. The resource planner monitors what activities are allowed to gain access to a resource and how much of the resource may be granted to each activity. The resource planner may manage multiple resources, and the resources it manages may be of different types. The set of resources managed by the resource planner may change over time. The resource planner, like other components of the resource management mechanism of the preferred embodiment, is implemented as an object.

In general, an activity seeks to reserve resources that it needs before it uses those resources. An activity reserves resources by requesting the reservation of a number of resources from the resource planner. The activity specifies the quantity of each resource it wishes to reserve. The resource planner applies a policy to the request and determines whether the resources should be granted or not in view of pending reservations. If the resources are granted to the activity, the activity may proceed to use the resources. In such a case, the reservations are utilized in the scheduling of resources. The scheduling of the resources described in more detail in copending application entitled "Method and System for Scheduling the Execution of Threads Using Optional Time-Specific Scheduling Constraints", which was filed on even date herewith and which is assigned to a common assignee with the present application. If the request is not granted, the activity should not use the resource because the activity cannot be assured that adequate amounts of the resource will be available for the activity to run predictably.

FIG. 1 is a block diagram depicting a computer system 10 that is suitable for practicing the preferred embodiment of the present invention. The computer system 10 includes a central processing unit (CPU) 12 that has access to a primary memory 14 and a secondary storage 16. The primary memory 14 holds a copy of an operating system 18 that is well adapted for running real-time application programs 20 and 22. The operating system 18 provides an object-oriented environment and supports the Microsoft OLE 2.01 protocol. The operating system 18 also includes support for creating a resource planner 24. The primary memory 14 additionally holds a number of resource providers 26 corresponding to the local resources of the computer system 10. The computer system 10 may further include an input/output (I/O) device 28 and a network adapter 30 that connects the computer system 10 with a computer network 32, such as the Internet.

Although FIG. 1 depicts a single processor computer system for practicing the preferred embodiment to the present invention, those skilled in the art will appreciate that the present invention may also be practiced in distributed environments. Moreover, the present invention may be practiced in computer systems that have configurations that differ from that depicted in FIG. 1. The depiction in FIG. 1 of the computer system 10 is intended to be merely illustrative and not limiting of the present invention. For example, more than two real-time application programs may be concurrently running on the computer system in some alternative embodiments.

Figure 2:
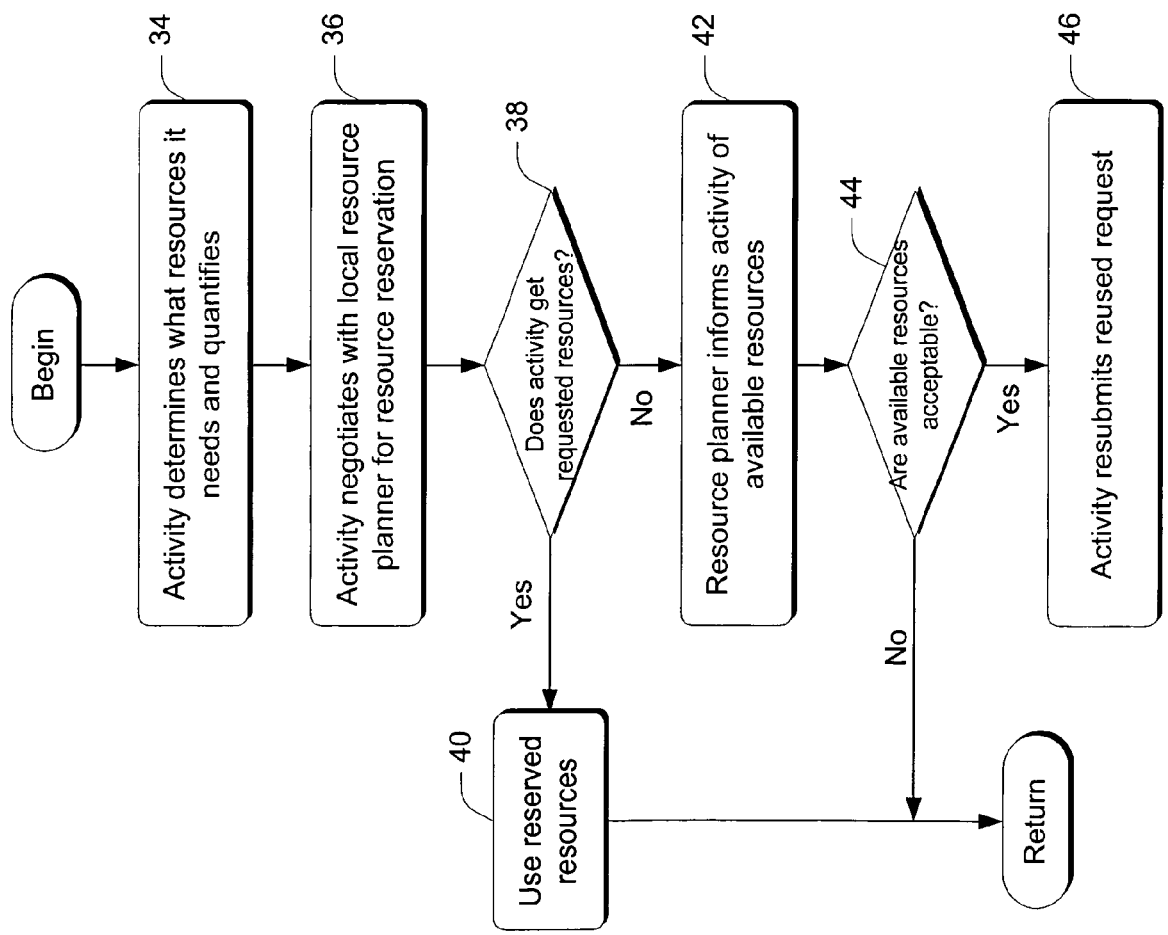
FIG. 2 is a flowchart illustrating the steps that are performed to negotiate resources in accordance with the preferred embodiment of the present invention.

As was mentioned above, in the preferred embodiment of the present invention real-time application programs are resource self-aware. The application programs 20 and 22 know what resources, as well as how much of those resources, they need to have to run properly and predictably. FIG. 2 is a flowchart illustrating the steps that are performed when an activity that is associated with an application program seeks to reserve resources. Initially, the activity determines what resources it needs (step 34 in FIG. 2). This determination involves an information gathering process. In the preferred embodiment of the present invention, the activity queries resource providers to determine what resources the activity needs. The activity is aware of what resource providers it uses, and the activity queries the resource providers it uses to determine what resources are, in turn, needed by those resource providers to perform their job and what quantities of resources are required for the resource providers to perform their job.

Figure 3:
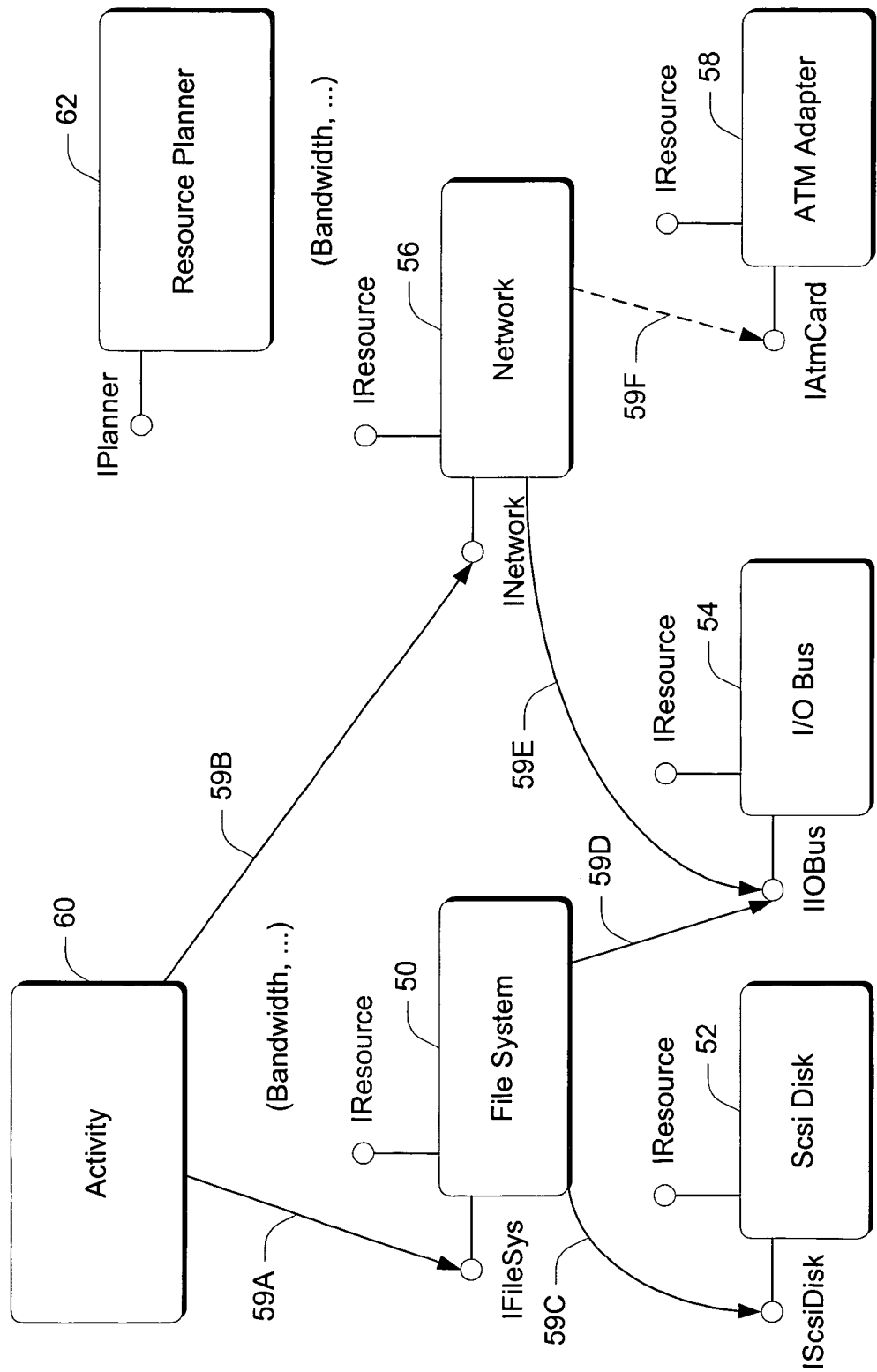
FIG. 3 is a block diagram illustrating an example of an activity querying resource providers to determine resource requirements in accordance with the preferred embodiment of the present invention.

In order to more fully understand the information gathering process, it is helpful to understand how the resource providers are logically organized. First, it should be appreciated that the resource providers are modularized. Resource providers may be components of larger modules. An example helps to illustrate this modularity. FIG. 3 depicts an example where an activity 60 needs to exploit disk bandwidth and network bandwidth to perform a network write operation. The activity knows that it must use the file system and the network to perform such a write operation. The file system has an associated file system resource provider 50, and the network has an associated network resource provider 56. In performing the disk read operation, the file system resource provider 50 recognizes that it must call upon the SCSI disk resource provider 52 and the I/O bus resource provider 54 to perform the disk read operation. The network resource provider similarly recognizes that it must call upon the I/O bus resource provider 54 and the asynchronous transfer mode (ATM) adapter 58 to perform the network write operation. Thus, the activity 60 realizes it must use disk bandwidth and network bandwidth, but the activity 60 relies upon the file system resource provider 50 and the network resource provider 56 to determine what additional resources are required to obtain the disk bandwidth and network bandwidth, respectively.

Software components that have real-time resource requirements provide interfaces that expose those requirements to their clients. This allows the clients to query the components about the resources that are needed to perform operations that the client will use. In other words, resource providers support interfaces that allow clients of the resource providers to determine what resources are required for particular operations. An interface, as used herein, is a Microsoft OLE 2.01 interface and refers to a named group of semantically related methods. Objects that implement the code for all of the methods in an interface are said to "support" the interface. Examples of interfaces supported by resource providers that may be queried to obtain resource requirements are the IFileSys, IScsiDisk, IIOBus, INetwork and IAtmCard interfaces shown in FIG. 3.

Figure 4:
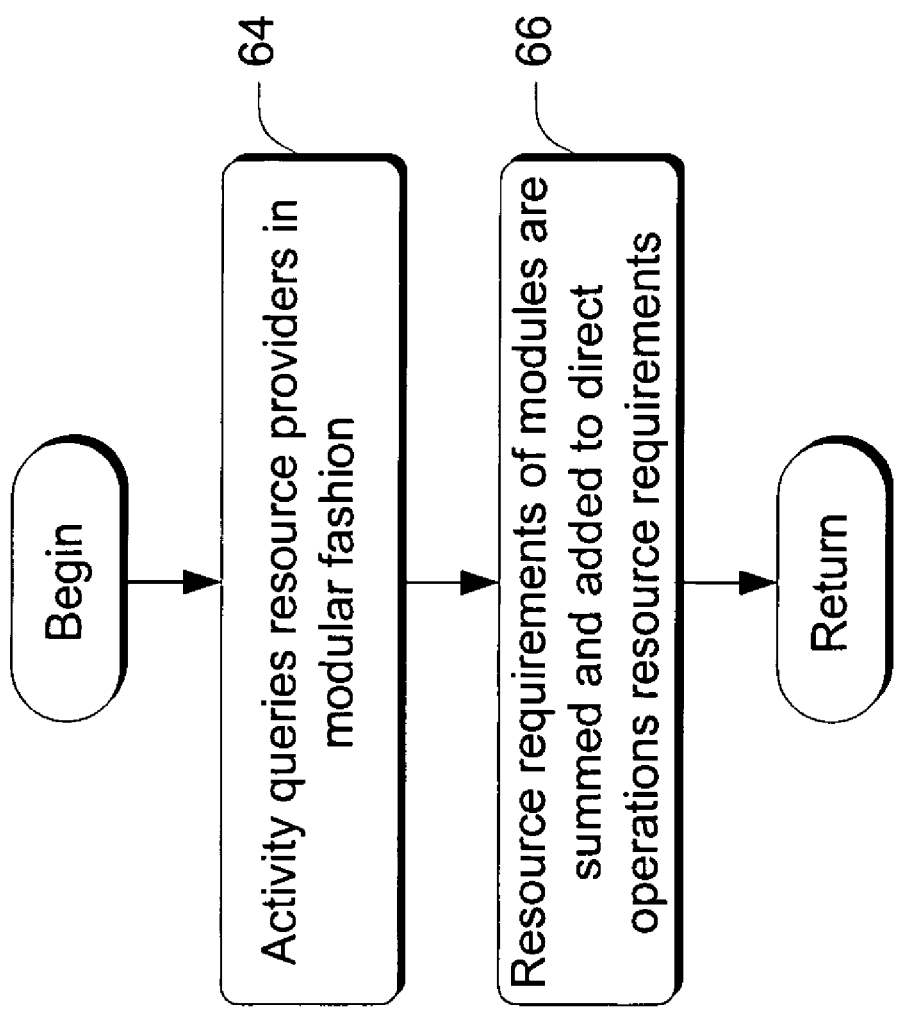
FIG. 4 is a flowchart illustrating the steps that are performed by an activity to determine its resource requirements.

FIG. 4 is a flowchart that illustrates the steps that are performed to determine what resources an activity needs (step 34 in FIG. 2). The activity queries the resource providers in a modular fashion (step 64 in FIG. 4). The queries are represented in FIG. 3 by arrows 59A, 59B, 59C, 59D, 59E and 59F. The queries are implemented as calls to methods in interfaces supported by the resource providers. The activity 60 sums the resources required by each of the resource providers it calls and adds any resources required by operations that it directly implements. Thus, for example in FIG. 3, the file system resource provider 50 is a client of the SCSI disk resource provider 52 and the I/O bus resource provider 54. The resource requirements of the file system resource provider 60 to perform the network read operation requested by the activity 60 includes the resource requirements of both the SCSI disk resource provider to perform its role in the operation, the resource requirements of the I/O bus resource provider 54 to perform its role, and the separate resource requirements of the file system resource provider 50. The resource requirements of the activity 60 are the cumulative resource requirements of the file system resource provider 50 and the network resource provider 56 in performing the network read operation. The resource requirements of the file system resource provider 50 and the network resource provider 56 reflect resource requirements of the modular components that are called by those resource providers. Thus, in step 66 of FIG. 4, the resources requirements of the modules are summed along with the direct resource requirements to determine the cumulative resource requirements for the activity.

Another alternative for determining resource requirements is to empirically determine what resources are used by an activity and to use the empirical determination as the basis for the resource requirements that are later requested. Such empirical estimates may be cached by an activity 60, by the operating system 18 or even by the resource planner 62. This alternative has the benefit of using less mechanism by clients because the alternative does not require the querying that is used in the above-described approach.

The above discussion has assumed that an activity knows how to determine what resources it needs. It may be helpful, in some instances, to provide system support for assisting an activity in determining the activity's resource requirements. The operating system 18 may provide support for an activity to readily determine its resource requirements for system operations that are available in the operating system application program interface (API) set. For example, if the user requests a read operation, the operating system 18 may provide a mechanism for determining the appropriate resource requirements for such an operation. Another alternative is for the system to record what resources are utilized during a read and cache those values so that the values are returned to the activity for use in making a resource reservation request.

Once the activity determines what resources it needs and the quantity of those resources it needs, the activity sends a request for the determined quantities of resources to local resource planner to obtain a reservation (step 36 in FIG. 2). The request that is submitted by the activity holds a "resource set." The resource set specifies what resources are requested and what quantity of those resources are requested. The resource set includes a number of pairs of resources and resource amounts. More formally, each pair of a resource set includes a reference to an IResource interface supported by a particular resource along with an amount specified in terms of the units of that resource. The IResource interface will be described in more detail below.

The amount value in a resource set pair is resource specific. For example, for CPU time, which is modeled as a resource, the resource amount is specified as a number of units per second of total CPU capacity per second. The total CPU capacity is viewed as 10 million units per second.

Each resource set is implemented as an object that supports the IResource set interface. This interface is formally defined as follows:

```
interface IResourceSet : IUnknown {
    import "mmtype.idl";
    import "actvty.idl";
    import "resour.idl";
    import "eresst.idl";
    SCODE AddAmount([in] IResource *Resource, [in] RESOURCE_AMOUNT Amount, [out]
        IResourceSet **pResSetResult);
        // Adds a resource and its amount to the set. Adds the resource to
        // the set if necessary, otherwise adjusts the amount. Returns a new
        // resource set with the addition included; original is unmodified.
    SCODE GetAmount([in] IResource *Resource, [out] RESOURCE_AMOUNT *Amount);
        // Gets the amount of a particular resource in the set.
        // Returns 0.0 as the amount if the resource is not in the set.
    SCODE Add([in] IResourceSet *Addend, [out] IResourceSet **Result);
        // Adds the contents of the specified set to this set and returns
        // the result. Resource amounts are added if present in both sets.
        // Returns a new resource set with the addition included; original is
        // unmodified.
    SCODE Subtract([In] IResourceSet *Subtrahend, [out] IResourceSet **Result);
        // Subtracts the contents of the subtrahend from this set. Used
        // e.g. to figure out what amount of a set of resources must become
        // available to satisfy a request. Returns a new resource set with
        // the modification included; original is unmodified.
    SCODE Enumerate([out] IEnumResourceSet **ppenm);
        // Returns enumerator for this resource set.
    SCODE CheckFree();
        // Returns S_TRUE if enough of each resource in the set is free
        // to reserve the amount associated with that resource.
    SCODE GetFree([out] IResourceSet **Free);
        // Returns a resource set with the same resources as this one, with
        // the amount associated with each resource in the set equal to the
        // amount currently free.
    SCODE Reserve([in] IActivity *Activity, [out] IResourceSet **Available);
        // Tries to reserve each resource in the set, in the amount
        // associated with it. Returns S_OK if all succeeded; the output
        // resource set pointer is NULL. Returns S_FALSE otherwise; no
        // resources are allocated, and the output resource set contains the
        // amount currently available of each requested resource.
        // Note: Intended for use by the resource planner.
```

-continued

```
SCODE TestIntersect([in] IResourceSet *IntersectWith);
    // Return S_TRUE if there are resources in common between the two
    // resource sets S_FALSE otherwise.
}
```

Figure 5:
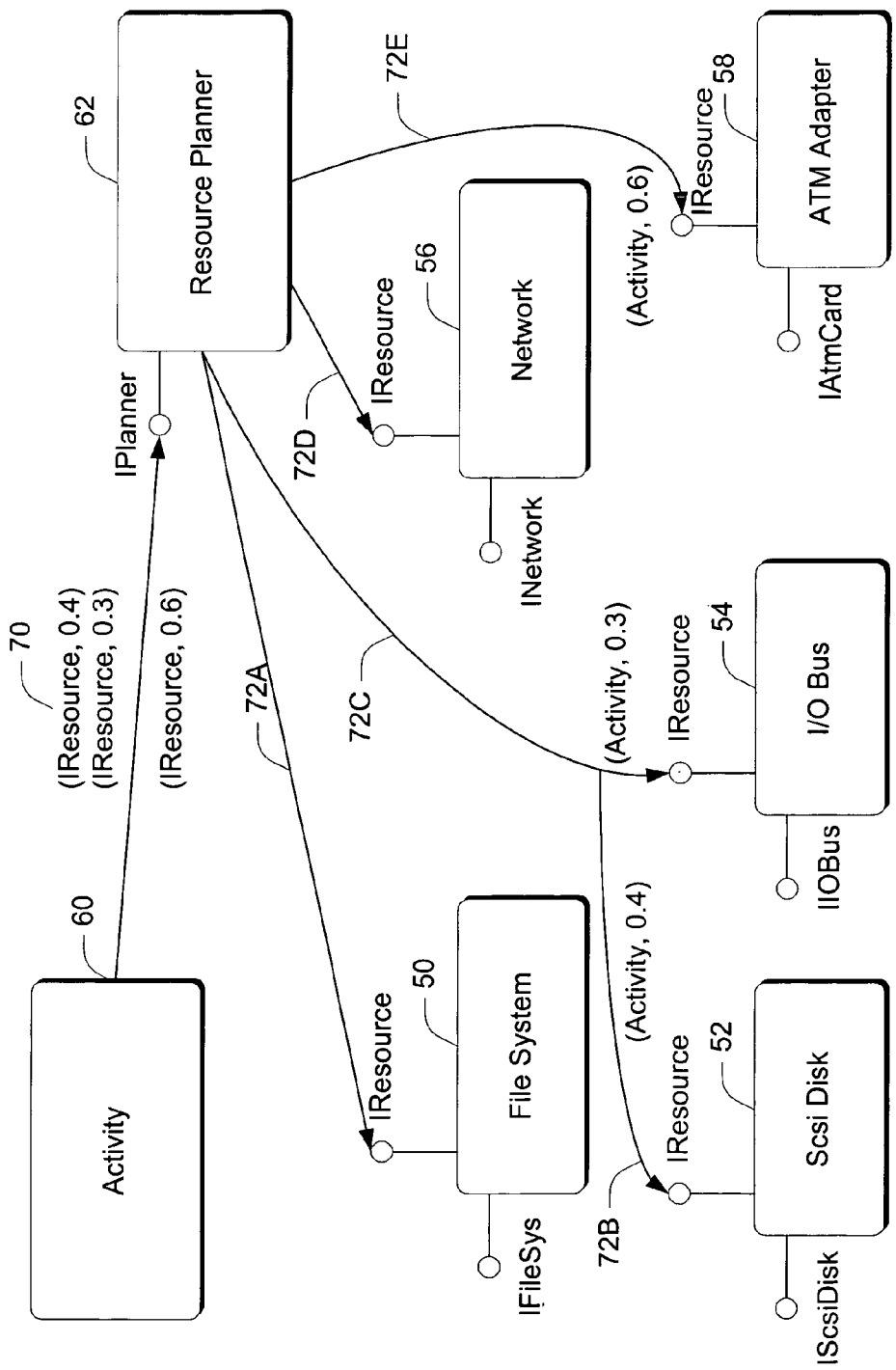
FIG. 5 is a block diagram illustrating the submission of a resource set in a reservation request to a resource planner and the resulting reservation calls when the request is granted in accordance with the preferred embodiment of the present invention.

FIG. 5 shows an example in which an activity 60 sends a resource set to the resource planner 62 to request quantities of resources. The resource planner 62 receives the resource set and applies an appropriate policy to determine whether the resources should be granted (step 38 in FIG. 2). If the resources are granted, the activity 60 may use the reserved resources (step 40 in FIG. 2). If, on the other hand, the resources are not granted, the resource planner 62 informs the activity 60 of the quantities of the requested resources that are available, if any (step 42 in FIG. 2). The activity 60 then may determine whether the available resources are acceptable (step 44 in FIG. 2). If such available resources are acceptable, the activity 60 may reformulate its reservation request to conform to the current availability of the resources (step 46 in FIG. 2). The negotiation process then is repeated by continuing execution at step 38 in FIG. 2. If, however, the available resources are not acceptable, the activity terminates.

Enforcement of the resource allocations in the preferred embodiment of the present invention is voluntary. It is assumed that an activity will comply with the decision of the resource planner 62 because the activity wishes to exhibit predictable performance. If the resource planner 62 indicates that the resources are not available and an activity decides to proceed anyway, it is likely that the activity will encounter serious problems while executing. The preferred embodiment also provides a mechanism for a resource to make known when a persistent overload condition exists. The resource provider may fail operations that exceed reservations. The resource planner may then force a renegotiation of resource reservations to more equitably distribute resource allocation. In other words, enforcement is voluntary but safety mechanisms are provided to help ensure good behavior.

As part of the process of granting resources to an activity 60, the resource planner 62 must contact each of the resource providers to reserve the appropriate portion of the resources that has been granted to the activity. Each resource, by definition, must support the IResource interface. This interface is formally defined as follows:

```
interface IResource : IUnknown {
    import "mmtype.idl";
    import "actvty.idl";
    import "respln.idl";
    SCODE Total Amount([out] RESOURCE_AMOUNT*Total);
        // Get the total amount of a resource.
    SCODE Reserve([in] IActivity *Client, [in] RESOURCE_AMOUNT
    Amount,
        [out] RESOURCE_AMOUNT *Actual);
    // Set the amount reserved of a resource for a particular client.
    // Upon return, return value will be S_TRUE if the resource amount
    // was granted. In this case, Actual will return the actual amount
    // of the resource granted. If the full amount requested could not
    // be granted, return value will be FALSE and Actual will return the
    // amount of the requested resource that is currently available. If
    // the amount reserved is less than the previous reservation then
    // some of the reservation will have been given back. The amount can
    // be zero, in which case the entire existing reservation is being
    // given back.
    // Note: This operation intended for use by the resource planner.
    SCODE GetReservation([in] IActivity *Client,
        [out] RESOURCE_AMOUNT *Amount);
    // Get the amount of the resource currently reserved for the client.
    SCODE GetUsage([in] IActivity *Client, [out]
    RESOURCE_AMOUNT *Amount)
    // Get the usage of the client since the last call to this method.
    SCODE GetFree([out] RESOURCE_AMOUNT *Amount);
    // Get the amount of the resource that is not currently reserved at
    // the time of the call.
}
```

The Reserve( ) method allows the resource planner 62 to reserve a certain quantity of the resource. Hence, for the example shown in FIG. 5, the resource planner 62 makes calls 72A, 72B, 72C, 72D and 72E to call the Reserve( ) methods of the IResource interfaces supported by the resource providers 50, 52, 54, 56 and 58, respectively.

As can be seen above, the IResource interface includes a TotalAmount( ) method that allows the resource planner 62 to determine the total amount or capacity of the resource in the resource specific units. The GetReservation( ) method returns the amount of the resource that is reserved for a particular activity but is specified in the parameters for the call to this method. The IResource interface also includes a GetFree( ) method that returns a value specifying a current amount of the resource that is available. The GetUsage( ) method returns the actual usage of the resource by an activity.

The above-described approach to requesting resources from a resource planner 62 is actually performed by calling the RequestResources( ) method that is supported by the IResourcePlanner interface of the resource planner 62. The IResourcePlanner interface is defined as follows.

```
interface IResourcePlanner : IUnknown {
    import "mmtype.idl";
    import "resset.idl";
    import "actvty.idl";
    import "actnfy.idl";
    //
    // Resource plan elements currently consist of a resource set.
    // May later be extended to pass additional information to the planner.
    //
    typedef IResourceSet *PlanElement;
    SCODE RequestResources([in] IActivity *Activity, [in] long
    cPlanElements,
        [in, size_is(cPlanElements)] PlanElement PlanElements[ ],
        [in] IActivityNotify *NotificationInterface,
        [out] long *Granted, [out] IResourceSet **Actual);
    // Request resources for an activity. Upon return, if the resources
    // could not be granted, Granted will be −1 and Actual will return
    // the amounts of the requested resources that are currently
    // available. Otherwise, Granted will be the index of the plan element
    // corresponding to the resource set that was granted. In this case,
    // Actual will return the actual amount of each resource granted.
    // The plan elements requested are ordered in decreasing value to the
    // application. The activity also supplies its resource notification
    // interface pointer to the planner at this time.
```

```
    SCODE ReleaseResources([in] IActivity *Activity);
        // Frees all resources reserved by an activity.
    SCODE CreateResourceSet(
            [in] IResource *Resource [in] RESOURCE_AMOUNT Amount,
            [out] IResourceSet **ResourceSet);
        // Creates a resource set. If the resource provided is NULL then
        // an empty resource set is returned. If a resource is provided
        // then a singleton resource set with the resource and amount
        // specified is returned.
}
```

The RequestResources( ) method is passed a resource set and passes out a value that specifies either that the resource reservation for the input resource set was granted or was not granted. If the request was not granted, a resource set is passed out that specifies the amount of available resources of the type asked for. The ReleaseResources( ) method releases all the resources that are reserved by an activity, and the CreateResourceSet( ) method creates a resource set.

Figure 6A:
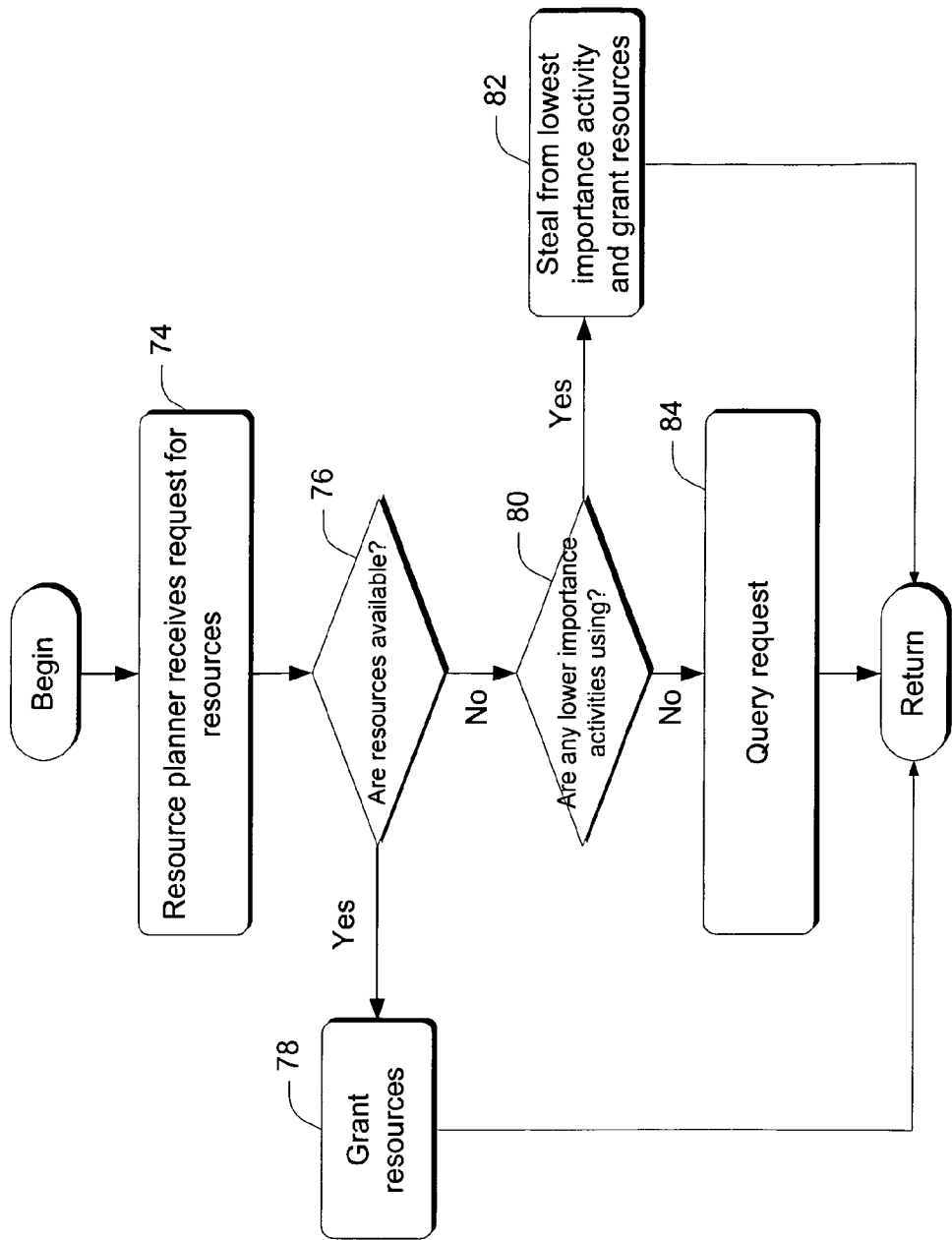
FIG. 6A is a flowchart illustrating the steps that are performed by the resource planner to implement the policy of the preferred embodiment of the present invention.

The above discussion has not focused on the policy that is adopted by the resource planner in the preferred embodiment of the present invention. FIG. 6A is a flowchart illustrating the steps that are performed by this policy. Nevertheless, those skilled in the art will appreciate that other policies may be implemented in practicing the present invention. In general, the resource planner implements the policy of the policy module it supports. This resource module may be changed and different embodiments of the present invention may employ different policy modules. Nevertheless, in the preferred embodiment, the policy module is implemented through the IResourcePlannerPolicy interface, which is defined as follows.

```
interface IResourcePlannerPolicy : IUnknown {
    import "mmtype.idl";
    import "resset.idl";
    import "actvty.idl";
    SCODE SetImportance([in] IActivity *Activity, [in] IMPORTANCE Importance);
        // Inform the resource planner that the indicated activity has
        // transitioned to the specified importance. This may trigger a
        // resource negotiation.
    SCODE GetImportance([in] IActivity *Activity, [out] IMPORTANCE *Importance);
        // Get the current importance level for an activity.
    SCODE OnOverload([in] IActivity *Activity,
            [in] IResource *Overloaded, [in] RESOURCE_AMOUNT AmountUsed);
        // Tell resource planner that an activity has consistently used more
        // of a resource than it has reserved.
}
```

Initially, the resource planner receives a request for resources from an activity (step 74 in FIG. 6A). The resource planner then checks whether the requested resources are currently available in the requested amounts (step 76 in FIG. 6A). If the resources are available in the requested amounts, the resources are granted to the activity (step 78 in FIG. 6A). If the resources are not all available in the requested quantities, the resource planner checks whether any lower importance activities are using resources that are requested so that the resources may be reassigned to complete the resource reservation of the requesting activity (step 80 in FIG. 6A). The policy of the preferred embodiment in the present invention employs the notion of importance where activities can be ranked according to importance, and the importance of activities may be compared. If lower importance activities are using sought resources that have been requested by the higher importance requesting activity, these resources are reassigned to be granted to the higher importance requesting activity in order to completely satisfy the resource reservation request (step 82 in FIG. 6A).

Figure 6B:
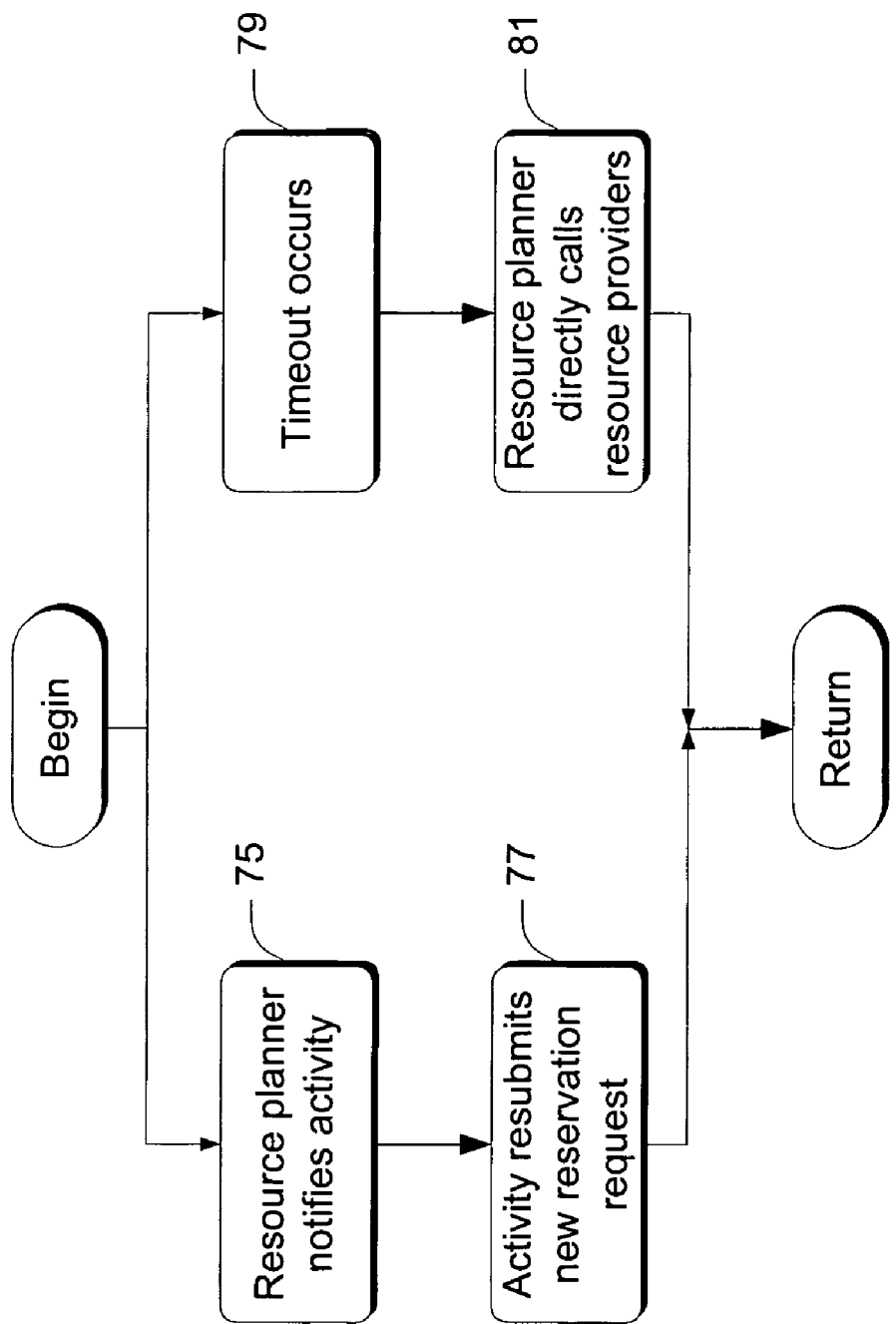
FIG. 6B is a flowchart illustrating the sub-steps that are performed to perform step 82 of FIG. 6A.

The reassignment of resource reservations is realized by either direct resource provider action or by prompting renegotiations by lower importance activities. FIG. 6B is a flowchart illustrating the steps that are performed in performing step 82 of FIG. 6A. Typically, the resource planner notifies the lower importance activity that another activity needs some of the resources it is using more than the informed activity does (step 75 in FIG. 6B). The resource planner performs such notification by calling a method on the IActivityNotify interface which each activity supports. This interface is formally defined as follows.

```
interface IActivityNotify : IUnknown {
    import "mmtype.idl";
    import "resset.idl";
    import "actvty.idl";
    SCODE OnOverload([in] IActivity *Activity,
            [in] IResource *Overloaded, [in] RESOURCE_AMOUNT
            AmountUsed);
        // Tell an activity that it has consistently used more of a
        // resource than it has reserved.
    SCODE OnNeed([in] IActivity *Activity, [in] IResourceSet *Shortage);
        // Tell an activity that other activities need a set of resources
        // more than it does. The Shortage resource set says which resources
        // are needed, and how much.
    SCODE OnAvailable([in] IActivity *Activity, [in] IResourceSet
            *Available);
        // Tell an activity that additional resources have become available
        // that it may wish to negotiate for. The Available resource set
        // says which additional resources are now available, and how much.
}
```

The resource planner calls the OnNeed( ) method to inform the lower importance activity of the quantity of resources that are reserved by that activity are needed by other activities.

The lower importance activity then resubmits a new reservation request relinquishing the resources that are needed by the higher importance activity (step 77 in FIG. 6B).

Alternatively, the resource planner may directly intervene when activities are poorly behaved. In such an instance, a time-out occurs (step 79 in FIG. 6B), and the resource planner directly calls resource providers on behalf of an activity to change the resource reservations for the activity (step 81 in FIG. 6B). Specifically, the resource planner calls the Reserve( ) method to alter the resource reservations of the lower importance activities that are poorly behaved to relinquish the resources for use by the higher importance activities.

If there are no lower importance activities using the resources that have been requested but are unavailable, the resource reservation request is denied (step 84 in FIG. 6A). The GetImportance( ) method is used to determine the importance of activities in the above-described process.

Figure 7A:
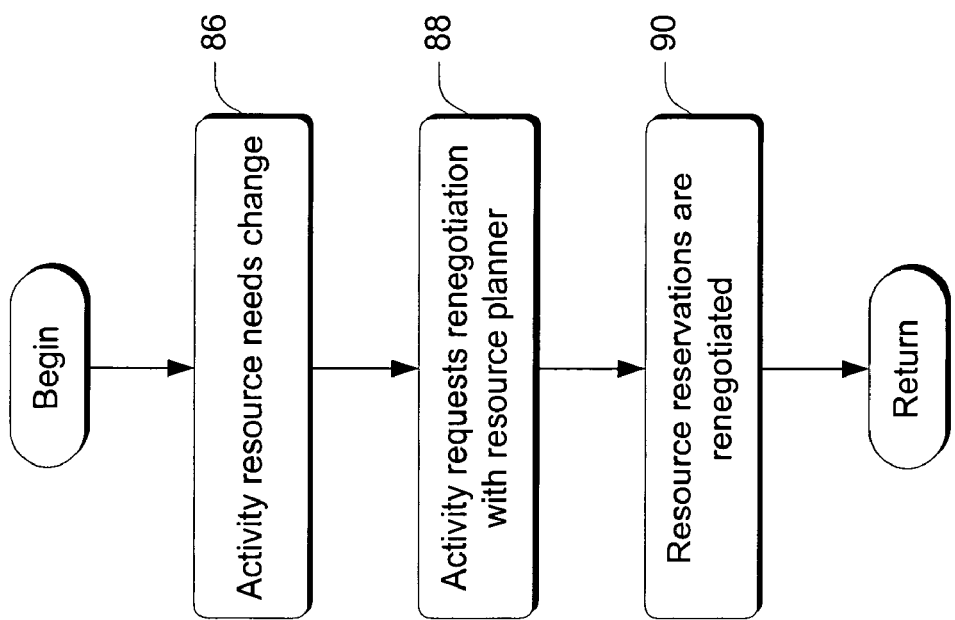
FIG. 7A is a flowchart illustrating the steps that are performed to realize renegotiation when the resource needs of an activity change.

The preferred embodiment of the present invention assumes that resource reservations do not need to be frequently renegotiated. Nevertheless, in order to provide flexibility and adaptability to changing resource needs, the preferred embodiment facilitates the renegotiation of resource reservations. A number of different events may trigger such renegotiation. This dynamic feedback helps to keep the resource management mechanism self-aware. For example, the changing resource needs of an activity may trigger a renegotiation. FIG. 7A shows a flowchart of the steps that are performed when an activity changes its mode of execution such that its resource needs change substantially enough to warrant renegotiation. Initially, the activity resource needs change enough to warrant renegotiation (step 86 in FIG. 7A). The activity then contacts the resource planner to request renegotiation change the activity's resource reservations (step 88 in FIG. 7A). One example of such a contact is a new call to RequestResources( ) specifying a different set of resource amounts than currently granted. The resource planner then performs renegotiation with the activity to change the resource reservation granted to the activity (step 90 in FIG. 7A).

Figure 7B:
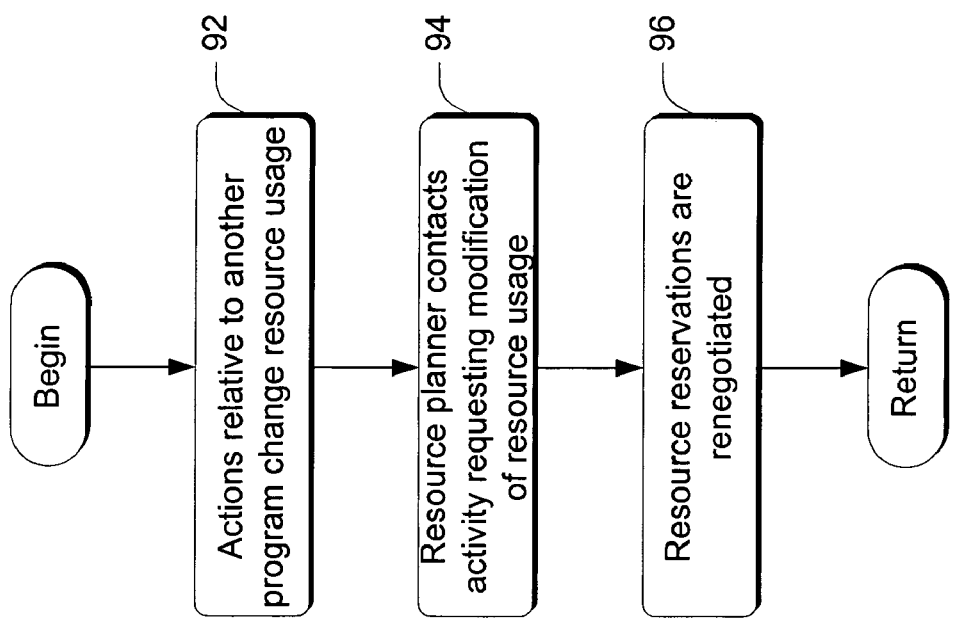
FIG. 7B is a flowchart illustrating the steps that are performed to realize a renegotiation of resource reservations when the actions of another program warrant a renegotiation.

Resource reservation renegotiation may be also triggered by the actions of other programs. For example, if other programs begin executing, cease executing or substantially change their resource usage, resource availability may change substantially enough to warrant resource reservation renegotiation. As shown in FIG. 7B, events relating to another program change resource usage (step 92 ). The resource planner then contacts a selected activity to request a modification of the activity's resource usages (step 94 in FIG. 7B). For example, the resource planner may call the OnNeed( ) method of an activity to indicate that the activity needs to relinquish resources or the resource planner may call the OnAvailable( ) method to cause an activity to seek more resources. Further, policy may change, causing the SetImportance( ) method to be called, which may trigger renegotiation. Resource reservations are then renegotiated using the negotiation process described above relative to FIG. 2 (step 96 in FIG. 7B).

Figure 7C:
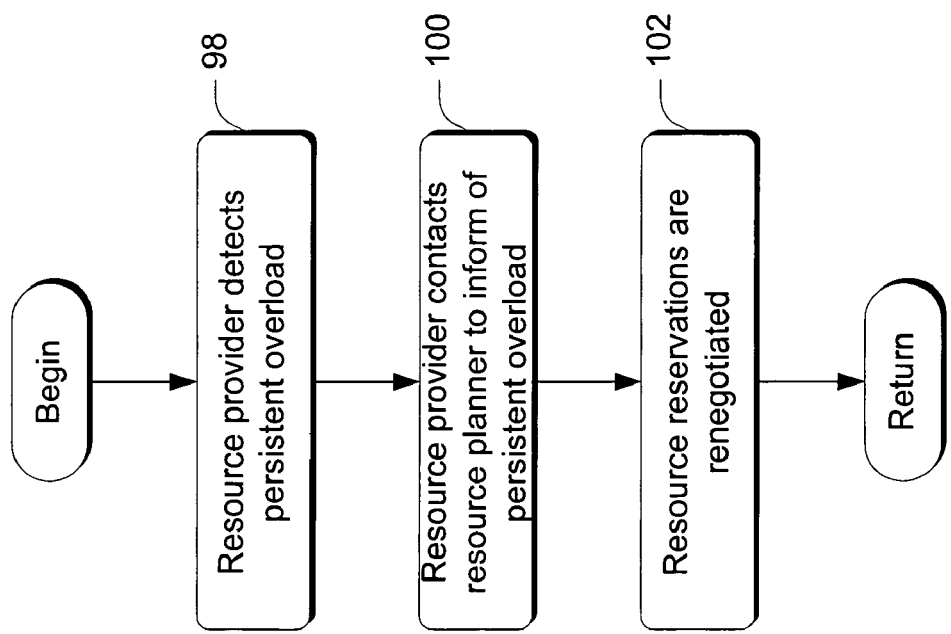
FIG. 7C is a flowchart illustrating the steps that are performed to realize a renegotiation when a resource provider detects a persistent overload condition.

A final type of event that may trigger resource reservation renegotiation arises when a resource provider experiences persistent overload. FIG. 7C is a flowchart that illustrates the steps that are performed in such an instance. Initially, the resource provider detects a persistent overload condition (step 98 in FIG. 7C). The resource provider then contacts the resource planner to inform the resource planner of the persistent overload condition (step 100 in FIG. 7C). The resource planner may inform an activity that it has consistently overused a resource and initiate a renegotiation by calling the OnOverload( ) method of the activity. The renegotiation process is subsequently performed (step 102 in FIG. 7C).

Figure 8:
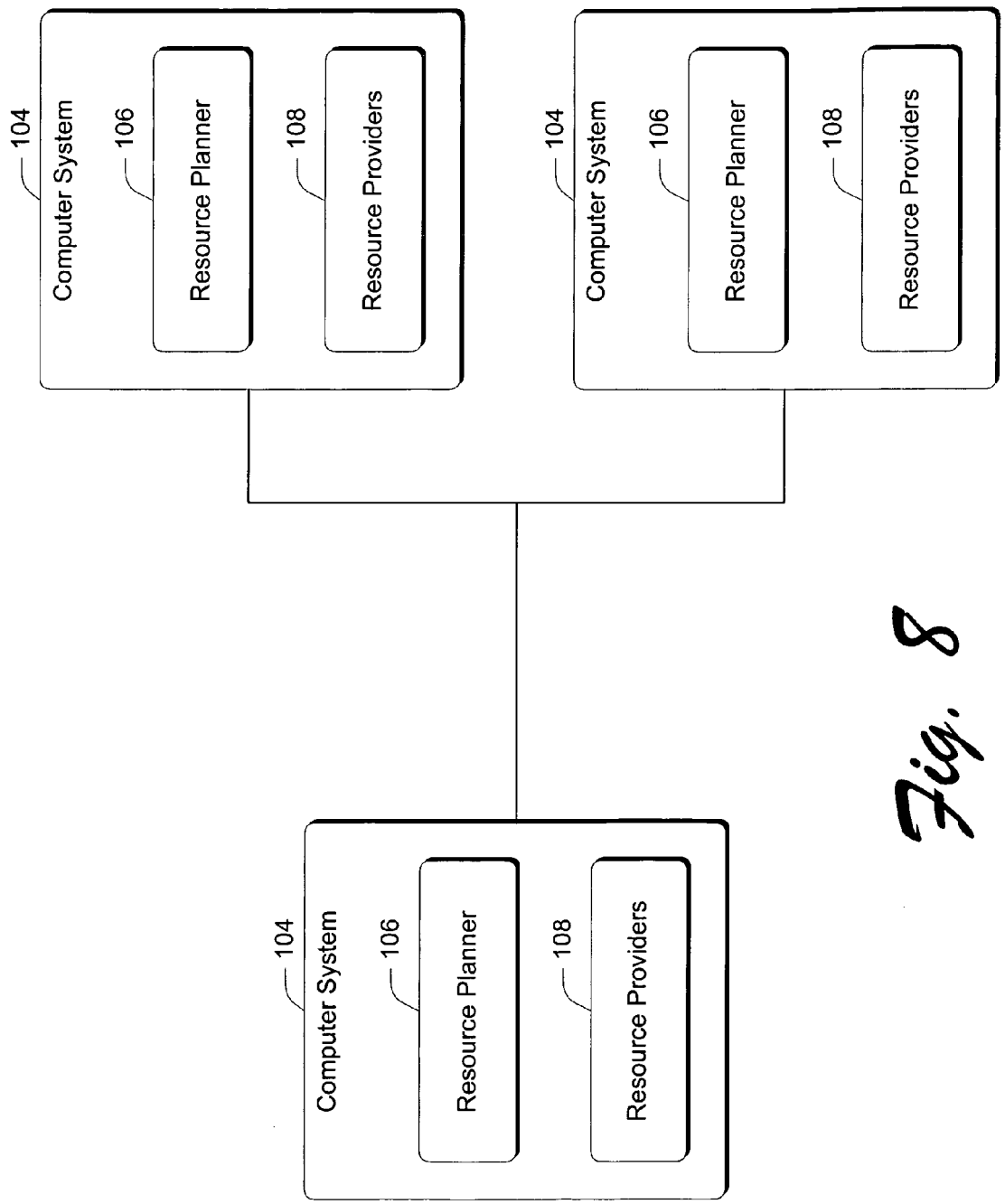
FIG. 8 is a block diagram illustrating an example of a distributed system that is suitable for practicing one embodiment of the present invention.

The above-described examples have dealt with instances where activities request local resources. The preferred embodiment of the present invention also enables activities to request remote resources. This capability is in large part realized by maintaining separate but cooperating resource planners on each computer system within a distributed environment. For example, as shown in FIG. 8, each of the computer systems 104 in the illustrated distributed environment includes its own resource planner 106 that is responsible for managing the resources that are local to the computer systems 104. Each computer system 104 includes local resource providers 108 that are associated with local resources and managed by the local resource planner 106.

Figure 9:
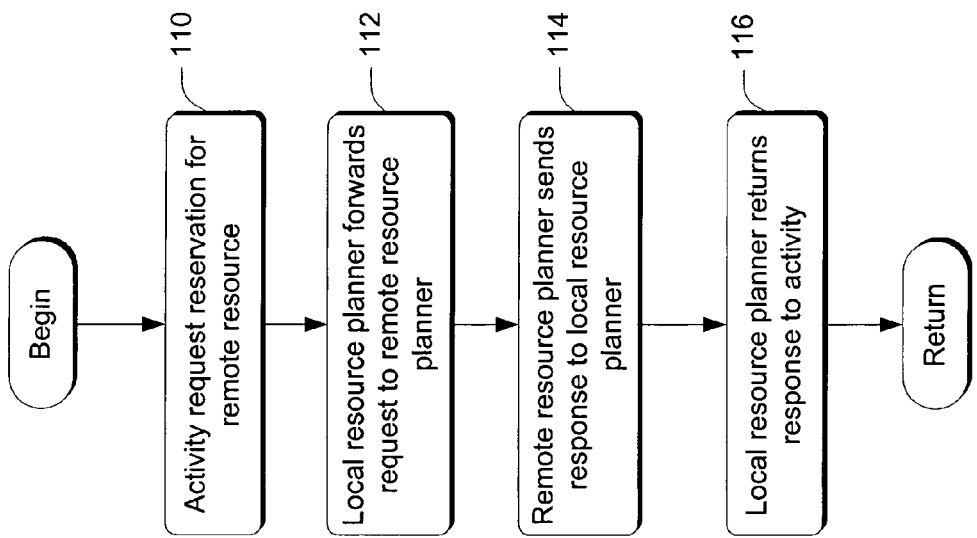
FIG. 9 is a flowchart illustrating the steps that are performed to process a request for resource reservations for a remote resource in accordance with the preferred embodiment of the present invention.

FIG. 9 is a flowchart illustrating the steps that are performed when an activity requests a resource reservation for a remote resource. The process begins with a local activity requesting a reservation for a remote resource (step 110 in FIG. 9). This may occur, for instance, when a resource set that contains references to some remote resources (as well as possibly some local resources) is passed a Request Resources( ) call to the local resource planner. Such sets may result from resource query calls to modules implemented by remote objects or via remote procedure calls. The local resource planner receives the request and forwards the request to the remote resource planner for the machine on which the remote resource is found (step 112 in FIG. 9). The remote resource planner processes the request and sends a response back to the local resource planner (step 114 in FIG. 9). The local resource planner receives the response and forwards it to the requesting activity (step 116 in FIG. 9).

The present invention is particularly useful in a networked environment, like the Internet, when data is to be transferred over the network. The preferred embodiment of the present invention ensures that the transmission of data, such as audio data or video data, that have real-time delivery requirements are delivered in a timely fashion. Specifically, the preferred embodiment of the present invention ensures that the resources that are required to ensure timely delivery of the data are guaranteed to the activity that is associated with delivering the data. Hence, the preferred embodiment to the present invention guarantees the fidelity of application programs in a distributed environment.

While the present invention has been described with reference to a preferred embodiment thereof, those skilled in the art will appreciate that various changes in form and detail may be made without departing from the intended scope of the present invention as defined in the appended claims. For example, the present invention need not be practiced in an object-oriented environment. In addition, substantially more sophisticated resource management policies can be implemented, such as policies that do not rely on a strict importance ordering among activities.

The invention claimed is:

1. In a computer system having a first set of resources and a second set of resources including an amount of each resource, wherein the amount being specified in terms of units specific to each resource in the set of resources and a resource planner for granting reservations of amounts of currently available resource to activities, a computer implemented method comprising:

submitting by an activity a request for a reservation of the second set of resources in specified amounts to the resource planner;

determining at the resource planner that the request cannot be granted;

returning from the resource planner to the activity a list, the list including an amount of each currently available resource that satisfied the resource reservation request and an amount of each currently available resource that did not satisfy the resource reservation request, the amounts being specified in terms of units specific to each resource in the set of resources;

determining at the activity whether the amounts of each currently available resource satisfy the resource reservation request and will allow the activity to execute predictably;

executing the activity when the resource reservation request is satisfied, otherwise, when the amount of each currently available resource does not satisfy the resource reservation request, reformulating the request for a reservation of the set of resources to new specified requested amounts using the amounts of each currently available resource in the list;

resubmitting the reformulated request to the resource planner;

executing the activity using the new amounts; and in view of changing resource usage or requirements, renegotiating between the resource planner and the activity to change the resource reservation to reflect the changing resource usage or requirement, wherein the method is implemented with a processor.

2. In a computer system having a set of resources including an amount of each resource, wherein the amount being specified in terms of units specific to each resource in the set of resources and a resource planner for granting reservations of amounts of currently available resources to activities, a computer implemented method comprising:

negotiating between the resource planner and activities to reserve shares of the resources with the resource planner on behalf of the activities, wherein the reservation of resources is negotiable;

submitting by an activity a request for a reservation of the set of resources in specified amounts to the resource planner;

determining at the resource planner that the request cannot be granted;

in view of changing resource usage or requirements, renegotiating between the resource planner and the activities to change reservations of resources on behalf of the activities to reflect the changing resource usage or requirements, wherein the renegotiating includes returning from the resource planner to the activity a list, the list including an amount of each currently available resource that satisfied the negotiable resource reservation request and an amount of each currently available resource that did not satisfy the negotiable resource reservation request, wherein the renegotiating is based on the amount of each currently available resource, the amounts being specified in terms of units specific to each resource in the set of resources;

wherein renegotiating further includes determining at the activity whether the amounts of each currently available resource satisfy the resource reservation request and will allow the activity to execute predictably;

executing the activity when the resource reservation request is satisfied, otherwise when the amount of each currently available resource do not satisfy the resource reservation request, reformulating the request for a reservation of the set of resources to a new specified requested amounts using the amounts of each currently available resource in the list;

resubmitting the reformulated request to the resource planner;

executing the activity using the new amounts, wherein the method is implemented with the computer.

3. The method of claim 2 wherein the changing resource usage or requirements are the product of a new activity being performed.

4. The method of claim 2 wherein the changing resource usage or requirements are the product of an activity changing its resource requirements.

5. The method of claim 2 wherein the changing resource usage or requirements are the product of an activity no longer being performed.

6. The method of claim 2 wherein the changing resource usage or requirements are the product of a persistent overload of use of a resource.

7. The method of claim 2 wherein the changing resource usage requirements are the product of a change in resource allocation policy.

8. In a computer system having a first set of resources and a second set of resources including an amount of each resource, wherein the amount being specified in terms of units specific to each resource in the set of resources and a resource planner for granting reservations of amounts of resources to activities, a computer-implemented method comprising:

submitting a request for a reservation for the second set of resources in specified amounts from an activity to the resource planner;

determining at the resource planner that the request cannot be granted;

when the request cannot be granted, returning from the resource planner to the activity a list, the list including an amount of each currently available resource that satisfied the resource reservation request, and an amount of each currently available resource that did not satisfy the resource reservation request, the amount being specified in terms of units specific to each resource in the set of resources;

determining at the activity whether the amounts of each currently available resource satisfy the resource reservation request and will allow the activity to execute predictably;

executing the activity when the resource reservation request is satisfied, otherwise, reformulating the resource reservation request for a reservation of the set of resources to a new specified requested amounts using the amounts of each currently available resource in the list;

resubmitting the reformulated request to the resource planner;

executing the activity using the new amounts; and in view of changing resource usage or requirements, renegotiating between the resource planner and the activity to change the resource reservation to reflect the changing resource usage or requirements, wherein the method is implemented with hardware.

* * * * *